March 10, 1959 F. M. PEARSALL, JR., ET AL 2,877,357

TRANSISTOR CIRCUITS

Filed April 20, 1955 2 Sheets-Sheet 1

INVENTORS: F. M. PEARSALL, JR.
R. E. STAEHLER

BY James J. Falk

ATTORNEY

TRANSISTOR CIRCUITS

Filed April 20, 1955

2 Sheets-Sheet 2

INVENTORS: F. M. PEARSALL, JR.
R. E. STAEHLER

BY: [signature]

ATTORNEY

United States Patent Office 2,877,357
Patented Mar. 10, 1959

2,877,357

TRANSISTOR CIRCUITS

Frank M. Pearsall, Jr., Merrick, and Robert E. Staehler, Brooklyn, N. Y., assignors to Bell Telephone Laboratories, Incorporated, New York, N. Y., a corporation of New York Application April 20, 1955, Serial No. 502,678
13 Claims. (Cl. 307—88.5)

This invention relates to electrical circuits employing transistors and more particularly to such circuits employing transistor multivibrators or flip-flops in shift register stages.

It is known that a pair of transistors can have their collectors and bases cross-connected to form a bistable flip-flop or multivibrator circuit; such circuits may advantageously be connected in tandem as stages of a shift register circuit. It is desirable to have the transistor flip-flop stable and in the past this has been attained by driving the transistors into saturation when conducting. Saturation, as is known, occurs when there is more than enough base current to satisfy the collector current, thereby giving rise to excess minority carriers in the base of the transistor. When a transistor saturates, the internal dissipation or loss is reduced. However, when transistors are saturated they become insensitive to applied pulses, requiring larger pulses to turn them off and also requiring an additional period of time after the pulse is applied to turn off due to the necessity of sweeping out or removing these excess minority carriers.

This situation is considerably aggravated when one starts placing actual transistors into circuitry as the various transistors utilized may have a fairly wide range of alphas. If the circuit is designed so that the low alpha transistors are just out of saturation, then the high alpha transistors will be driven well into saturation where a stronger pulse is required to turn them off and they require a longer time to be turned off. On the other hand, if the circuit is designed so that the higher alpha transistors do not saturate, then the lower alpha transistors are being operated inefficiently, with increased internal power dissipation.

It is a general object of this invention to provide improved transistor multivibrator or flip-flop circuits. More specifically, it is an object of this invention to provide improved transistor circuits for employment as stages of a shift register circuit.

It is another object of this invention to enable a transistor having a wide range of alphas to be employed in a shift register circuit.

It is still another object of this invention to assure that all transistors in the flip-flop sections of a shift register are maintained out of saturation. Specifically, an object of this invention is the clamping of such transistors out of saturation without the employment of additional circuitry.

It is a further object of this invention to increase the rapidity and response of operation of a transistor shift register circuit. Thus it is an object of this invention to provide a high speed shift register circuit utilizing a minimum number of components and operable with a highly variable load.

These and other objects of this invention are attained in specific embodiments wherein each register stage of a shift register circuit comprises a symmetric junction transistor flip-flop, a transistor amplifier direct current coupled to each of the transistors of the flip-flop section, and a transmission gate connected to the output of the transistor amplifiers. The amplifier section is thus an integral part of the shift register stage and not, as has been normally done before, connected to an output from the shift register stage.

The transistor amplifier follows the operation of the flip-flop circuit, provides current for a highly variable direct current load and also furnishes a reference potential for the transmission gate, which, under control of a shift pulse, shifts the information stored in one register stage to the next register stage. Further, in accordance with an aspect of this invention, the transistor amplifier also comprises a clamping circuit to clamp the voltage of the collector of the flip-flop transistor to which it is connected at a value above that requisite for saturation of the flip-flop transistor. In one specific embodiment, the collector of the flip-flop transistor is direct current coupled to the base of the amplifier transistor and the amplifier transistor collector voltage is chosen to keep the flip-flop transistor out of saturation. The voltage at the collector of the flip-flop transistor, when conducting, is effectively the voltage of the collector of the amplifier transistor, less the IR drops in the direct current path between them. Accordingly, nonsaturation of the conducting flip-flop transistor is assured without the use of extra components for clamp circuitry.

By employing shift register stages in accordance with this invention, it is possible to employ practically any transistors, regardless of the range of their alphas, by designing the flip-flop section so that the transistors with the poorer alphas tend to saturate. The transistors with higher alphas would of course then also tend to saturate. The transistors, however, will be held out of saturation by the clamping action of the amplifier transistors; thus the response of the flip-flop circuit will be rapid and at the same time the dissipative internal losses will be kept within acceptable limits. In one specific illustrative embodiment, transistors having an alpha range of from .95 to .995 or a one minus alpha ratio of ten to one were all employed interchangeably.

In order to attain both rapidity of response of the shift register circuit and a large current output to a wide variety of direct current loads, it is desirable not only that the flip-flop transistors be held out of saturation by the amplifier transistors, as explained above and in accordance with one aspect of this invention, but also that the amplifier transistors do saturate. When the amplifier transistor is driven into saturation, an excess carrier problem arises and it becomes necessary for high speed operation to sweep the excess carriers out of the transistor when it is turned off. In certain embodiments of this invention wherein the base of the amplifier transistor is direct current coupled to the collector of the flip-flop transistor, the charge carriers would be swept right back into the other transistor. In accordance with another aspect of this invention, this is prevented by providing in these embodiments a decoupling diode connected in the direct current path between the collector of the flip-flop transistor and the base of the amplifier transistor and so biased that when the amplifier transistor is turned off, the connection between the two transistors is effectively broken. A resistance is connected, from a suitable bias, to the base of the amplifier transistor to provide both the necessary current to sweep out the minority carriers, thus speeding up amplifier turn-off, and also a path for these carriers.

Without a decoupling diode between the flip-flop and amplifier transistors in these embodiments, the amplifier will act as a continuous clamp on the flip-flop, slowing down or even preventing its turning off. Because the amplifier transistor is operating in saturation with high current flow, considerable minority carriers, which may be holes or electrons, build up inthe base region. If these carriers are not swept out and a pulse is applied to the base of the flip-flop transistor to turn both that transistor and the amplifier transistor off, the collector of the flip-flop transistor will start to change its potential but is delayed by the amplifier. By the time the amplifier minority carriers are swept out and it starts to follow the flip-flop transistor, there is not enough left of the pulse to carry through the turn-off and the flip-flop transistor returns to its "On" condition. The diode, however, will isolate the amplifier and the flip-flop during turn-off since, in accordance with this invention, only a slight excursion of the latter from its operating potential is sufficient to reverse the bias of the diode. With the amplifier transistor thus isolated from the flip-flop, a separate current path is provided for the excess carriers of the amplifier transistor.

In this manner the flip-flop transistors have a very rapid response, enabling the shift register to be utilized at a high frequency of operation, while at the same time the amplifier transistors can be operated in saturation to allow a large current to be supplied to a very variable load.

In other specific illustrative embodiments of this invention wherein it is not required to provide a large current to a varying load, the amplifier transistor may be otherwise connected to the flip-flop transistor to provide the direct current clamping of the collector of the flip-flop transistor and thus maintain that transistor out of saturation. Thus the collector of the flip-flop transistor may be connected to the emitter of the amplifier transistor, with the clamping potential applied to the base of the amplifier transistor, or the collector of the flip-flop transistor can be direct current connected to the base of the amplifier transistor, but the clamping potential applied to the emitter of the amplifier transistor and the output of that stage of the shift register circuit taken from the collector of the amplifier transistor. In not all of these embodiments is a decoupling diode essential in the direct current path between the two transistors, though in all cases it is advantageous to provide optimum results.

The amplifier output also works into a transmission type gate which acts as a medium for shifting the stored digit or information from one stage to the next upon the application of a shift pulse. In the embodiment of this invention wherein the flip-flop transistor collector is connected to the base and the clamping potential to the collector of the amplifier transistor, the direct current level of this gate follows the transistor emitter. In one specific embodiment, the direct current level is more negative when the transistor is conducting than when the transistor is not conducting; the latter, in this embodiment, is the digit storing state. When the gate voltage level is most negative, it will prevent passage of the shift pulse and no change of state is transmitted. The gate includes a coupling condenser, to the next stage, and a resistor so that there is some inherent delay in the gate circuit; this delay as well as the delay in the transistor amplifier itself assure that the gate voltage does not change state while the shift pulse is applied. The resistor further serves to attenuate any back-up interference from the next coupled stage or from the shift pulse and prevents it from getting into the logic circuit. In addition, the direct current amplifier also prevents this back-up from resetting the preceding flip-flop.

In one specific embodiment of this invention, the decoupling diode is connected in the direct current path between the collector of the flip-flop transistor and the base of the amplifier transistor, the clamping potential being applied to the collector of the amplifier transistor to assure that the flip-flop transistor is kept out of saturation. However, various types of transistors and various potentials may be utilized in different embodiments of this invention.

It is a feature of this invention that the transistors of a flip-flop or multivibrator circuit be clamped out of saturation by a direct current connection to an amplifier transistor, a suitable bias being applied to the amplifier transistor thus to clamp the flip-flop transistor.

It is another feature of this invention that a decoupling diode be connected in the direct current path between the amplifier transistor and flip-flop transistor, the bias applied to the diode being such that the connection between the two transistors is effectively broken when the flip-flop transistor starts to turn off.

It is a further feature of this invention that a diode and a resistor, with suitable biases, enable a transistor amplifier to clamp the conducting transistor of a flip-flop out of saturation, decouple the flip-flop and the amplifier on turn-off of the flip-flop transistor, and assure a path for sweeping out minority carriers from the base of the amplifier transistor.

It is a still further feature that a shift register circuit include a plurality of stages each comprising a flip-flop section direct current coupled, through a decoupling diode, to a transistor amplifier and gate section, whereby a rapid response shift register capable of delivering large currents to varying loads is attained.

These and other features of this invention may be readily understood from the following detailed description and the accompanying drawing, in which.

Figure 1:
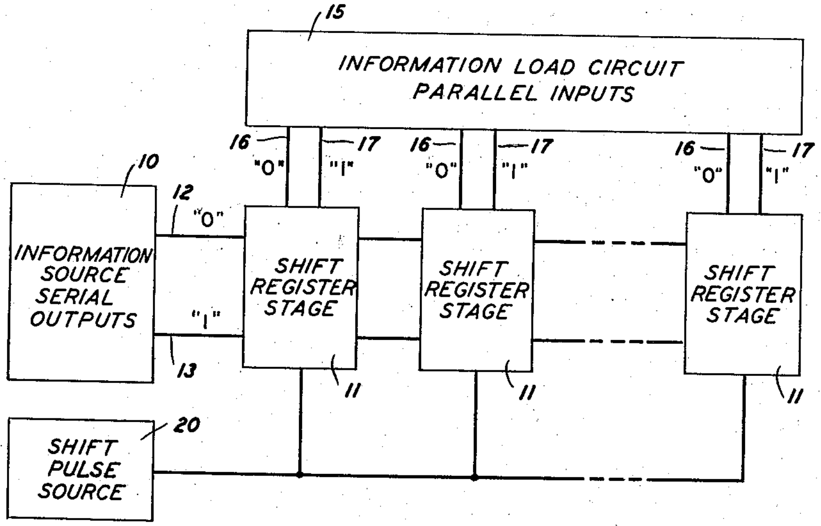
Fig. 1 is a block diagram of a shift register circuit in which embodiments of this invention may be employed.

Turning now to the drawing, a shift register circuit employing shift register stages in accordance with this invention is depicted in Fig. 1 and comprises an information source 10 having serial outputs applied to the first of a plurality of shift register stages 11. The outputs of the information source 10 are pulses appearing on either the "0" input lead 12 or the "1" input lead 13. Similarly the outputs of the shift register stages are applied as the parallel inputs to an information load circuit 15 and appear as pulses on either the "0" output leads 16 or the "1" output leads 17 of the stages 11. A shift pulse source 20 applies shifting pulses to each of the shift register stages to shift the information along the register at a frequency properly related to the frequency of the application of the input information from source 10.

The information source 10 may be one of many different types in which information is stored and read out in a serial manner; one known information storage of this type comprises a magnetic drum. Similarly the load circuit 15 may be of any of several types wherein it is desired to have information applied in parallel. Examples of such load circuits include registers and translators. Such load circuits may require large current inputs under varying impedance conditions or may require a constant current output.

Each shift register stage 11 comprises two sections; these are a first flip-flop or multivibrator section and a second amplifier and And gate section. These are indicated on the drawing for the specific embodiment depicted in Fig. 2. In this embodiment the flip-flop section comprises a pair of transistors 22 and 23 which may be n–p–n junction transistors; as discussed further below, other transistors known in the art may also be employed. The collectors and bases of the two transistors 22 and 23 are cross-connected, as by the resistances 25 and capacitors 26 to define a bistable multivibrator or flip-flop circuit, as is known in the art. The collectors are also connected, through individual resistors 27, to ground through the common resistor 28.

The bases of the transistors are each connected through a resistor 30 to a source of negative potential 31. The negative information pulses, such as a pulse 32, are applied from the information source or from the prior register stage 11 through resistors 33 to the bases of the transistors. The emitters are also connected to the negative source 31 through a resistor 35 and a capacitor 36.

The collectors of the transistors 22, 23 are connected through decoupling diodes 38, further described below, to the amplifier and gate section. Specifically, in the embodiment of this invention depicted, the collectors of the transistors 22, 23 are directly connected through the diodes 38 to the bases of the amplifier transistors 39, 40; accordingly the flip-flop section is, in accordance with an aspect of this embodiment, direct current coupled to the amplifier section of the shift register stage through the decoupling diode. The transistors 39, 40 may advantageously be p–n–p junction transistors, though other types known in the art may be employed.

The collectors of the transistors 39, 40 are directly connected to a source 41 of negative potential. The bases are also connected to a source of negative potential 42 through resistors 43. In accordance with an aspect of this invention, the voltage applied to the collector of the transistors 39, 40 from the source 41 is chosen, in relation to the source 31 of emitter potential for the transistors 22, 23, to clamp, through the direct current coupling between the two sets of transistors, the flip-flop transistors 22, 23 out of saturation under all load conditions. The amplifier transistors 39, 40 are driven into saturation, as further described below, in order to supply a large current to a wide variety of possible load conditions in the load circuit 15. However, the response frequency and the speed at which the flip-flop section can be driven, by the shift pulse source 20 and the information source 10, are now not dependent on the response of the amplifier section. Accordingly, by preventing the transistors of the flip-flop section from saturating, the response of the shift register circuit is maintained rapid.

Load resistors 45 are connected to the emitters of the transistors 39, 40. The emitters are also connected, through diodes 46, to the voltage source 42 and through a resistor 47 and a coupling condenser 48 to the input leads of the next stage of the shift register circuit. The successive stages of the shift register circuit are thus A.-C. coupled. The "0" output lead 16 to the load circuit 15 is connected to the emitter of transistor 39 and the "1" output lead 17 is connected to the emitter of transistor 40. Diodes 50 are also connected from the shift pulse source 20 to the point of connection between the resistor 47 and the condenser 48 for each transistor.

Figure 2:
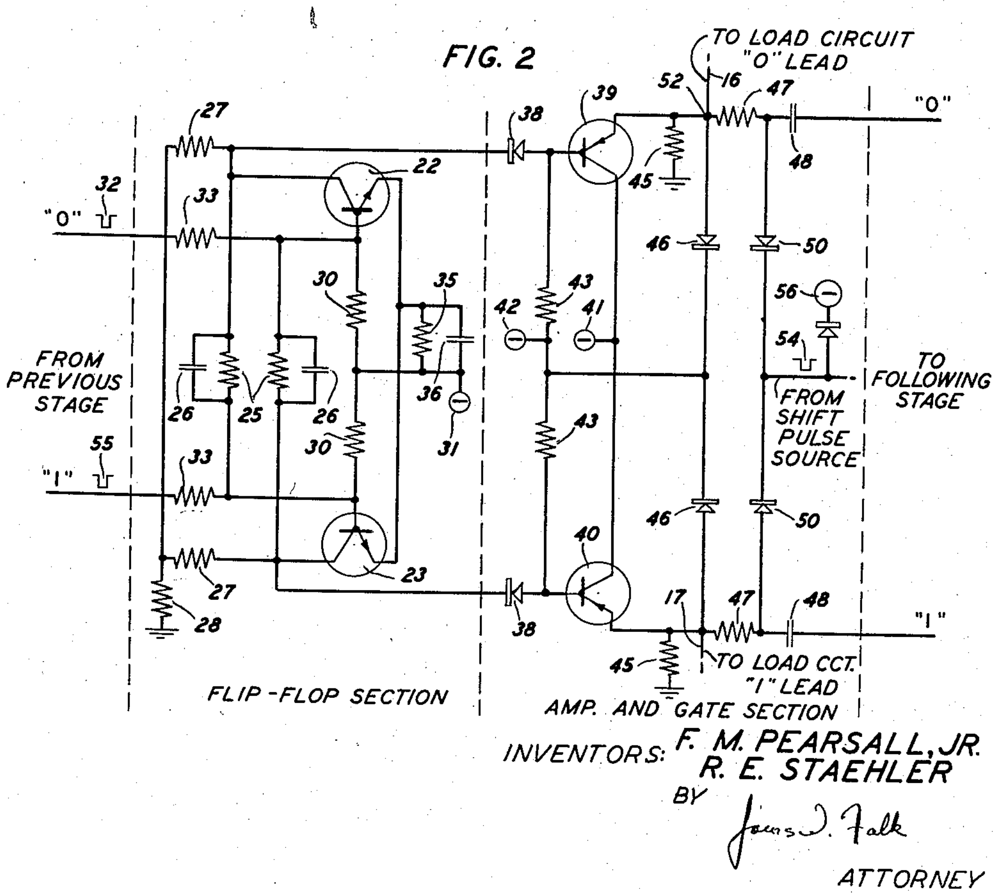
Fig. 2 is a schematic representation of a shift register stage in accordance with one embodiment of this invention.

A further appreciation and understanding of this invention can readily be gained from consideration of the operation of this specific embodiment depicted in Fig. 2 of the drawing. Let us assume that at a given instant the transistor 22 is conducting. Current will flow through the decoupling diode 38 to the amplifier transistor 39 which will also be conducting. A voltage is therefore developed across the resistor 45 and appears at the point 52. The voltage at point 52 when the transistor 39 is not conducting is substantially the voltage of the source 42 and, in one specific illustrative embodiment, was −15 volts. When transistor 39 conducts the voltage at point 52 drops approaching the voltage of the source 41 connected to the collector of the transistor 39; in this specific embodiment source 41 was −30 volts. The diode 46 assures that the voltage at point 52 remains within this range.

In this specific embodiment the load circuit 15 is responsive only to the less negative input voltage, namely −15 volts; accordingly, when transistor 39 is conducting the voltage at point 52 and thus on the output lead 16 will not apply an input signal to the load circuit 15. However, the more positive, or less negative, voltage will be applied to the output lead 17; accordingly, when the transistor 22 of the flip-flop section is conducting a "1" is stored in the shift register stage. When transistor 40 is conducting the less negative voltage appears on output lead 16 and a "0" is stored in the shift register.

A shift pulse 54 applied from the shift pulse source 20 advantageously has a maximum value that does not exceed the difference between the two values of voltage possible at point 52, i. e., between the voltages of sources 41 and 42. In this specific illustrative embodiment the shift pulse 54 was of the order of −7 volts, the bias voltage 56 at this point being maintained at −15 volts. Accordingly the −7 volts superimposed on the −15 volt bias gives a voltage level of −22 volts. The diodes 50 are so poled that a negative pulse will be transmitted through only that diode 50 connected to a less negative voltage; accordingly when the shift pulse 54 is applied to the diode gate comprising the diodes 50 a negative pulse, in the illustrative example being described, will appear on the "1" lead to the following stage of the shift register and no pulse will appear on the "0" lead to the following stage.

Let us now assume that, when the shift pulses 54 are applied to the shift register stages, a "1" had also been stored in the previous stage so that a negative pulse 55 is applied, through the resistor 33, to the base of the transistor 23. This pulse will tend to turn off the transistor 23. However, as a "1" had priorly been stored in this shift register stage, transistor 22 is conducting and transistor 23 non-conducting. The input pulse 55 will therefore not affect the circuit conditions of either the flip-flop or amplifier and gate sections.

The pulses from the prior stages are advantageously applied to the base of the transistors through the resistors 33. The shift pulse 54 is applied to all the stages in parallel and the various stages might not all have uniform resistance. By utilizing the resistors 33, the resistance of each stage is substantially uniform to the shift pulse source.

Now let us assume that a "0" was stored in the previous stage so that, on application of the shift pulse, a negative pulse 32 is applied through the resistor 33 to the base of the transistor 22. The base will now be more negative than the emitter and current between the collector and the emitter of the transistor is cut off. The voltage at the collector will therefore rise, sending a positive pulse through capacitor 26 to the base of the transistor 23, turning that latter transistor on. As the transistor 22 was not saturated, the positive pulse applied to transistor 23 is initially amplified and considerably larger than the negative pulse 32 applied to the base of the transistor 22.

Resistor 35 and capacitor 36 afford a low impedance path from the emitter of the transistor 22 to the source 31, when transistor 22 is turned off, to enable any minority carriers that might be present to be swept out, the capacitor 36 maintaining the emitter voltage constant. The common emitter resistor 35 in parallel with the capacitor 36 and between the bases and the emitters of the transistors 22, 23 enables the transistors to be self-biasing.

When transistor 22 cuts off, the voltage at the collector of the transistor goes positive and diode 38 between the collector and the base of the transistor 39 is back-biased. The amplifier section of the shift registers is therefore effectively decoupled from the transistor 22, removing the clamping voltage which had maintained the transistor 22 out of saturation. However, as transistor 22 is not conducting, this clamping voltage is not necessary. The collector of transistor 39 is at the potential of source 41, which in this exemplary embodiment is −30 volts. As the connection between the transistor 39 and the transistor 22 is now effectively broken, the base of transistor 39 can assume the potential of the source 42, which in this embodiment is −15 volts, rather than substantially the potential of the collector of the transistor 22.

Transistor 39, as mentioned above, is advantageously driven into saturation to enable a large output current to be applied to the load circuit; there are, therefore, excess charge carriers remaining in the transistor when it is cut off. These can drain off through the resistance 43 to the source 42. At the same time the emitter potential, i. e., the potential at the point 52, can rise to approximately −15 volts, thereby advising the load circuit that a "0" is now stored in the shift register stage, and the shift gate, comprising the diodes 50, is now enabled to apply a "0" stored signal to the following stage of the register circuit on application of the next shift pulse 54.

It should be pointed out that there is a slight delay between one application of the shift pulse and the enabling of the shift gate for the next shift pulse, so that information stored in one register stage is only applied to the next register stage on one application of the shift pulse and not to succeeding stages as well. This delay arises due to the turn-off time of the D.-C. amplifier transistors 39, 40 and also, in part, due to the time constant of the gate circuit.

In accordance with an aspect of this invention, as mentioned above, the transistors 22 and 39 and the transistors 23 and 40 are direct current coupled and the voltages applied to their various electrodes so chosen that the amplifier transistors 39, 40 clamp the flip-flop transistors 22, 23 out of saturation, thereby enabling transistors having a very wide range of alphas to be employed in the flip-flop section. In the specific embodiment depicted in Fig. 2 in which the collector voltage of the amplifier transistors 39, 40 is −30 volts, the collector voltage of the flip-flop transistors 22, 23 will be clamped slightly more negative than −30 volts, and specifically more negative than −30 volts by the voltage drop across the base-collector of the amplifier transistor and across the diode 38. If desired, a resistance may also be connected in the direct current path between the flip-flop and amplifier transistors to lessen the effect of possible variations in these semiconductor resistances. The collector voltage at transistors 22, 23 was clamped at approximately −32 volts in this illustrative embodiment.

The base and emitter of the flip-flop transistors are accordingly so biased that this clamping voltage on the collector is sufficient to maintain the transistor out of saturation. Specifically in this illustrative embodiment, the source 31 was −37 volts and the resistor 30 was chosen so that the base potential was sufficiently below the collector potential to prevent the transistor from saturating.

In one specific illustrative embodiment of this invention as depicted in Fig. 2, the various circuit elements described above had the following values:

| Resistors: | Ohms |
|---|---|
| 25 | 21,500 |
| 27 | 5,110 |
| 28 | 1,210 |
| 30 | 5,110 |
| 33 | 2,610 |
| 35 | 383 |
| 43 | 7,500 |
| 45 | 10,000 |
| 47 | 15,000 |

| Condensers: | | |
|---|---|---|
| 26 | mmf. | 120 |
| 36 | mf. | .01 |
| 48 | mmf. | 240 |

| Sources: | Volts |
|---|---|
| 31 | −37 |
| 41 | −30 |
| 42 | −15 |
| 56 | −15 |

Transistors 22, 23 were n-p-n junction transistors of M1853 or M1858 type; transistors 39, 40 were p-n-p junction transistors of the M1778 type; and diodes 38, 46, 50 were germanium diodes of the 400A type.

It is to be understood of course that the above-described parameters are merely illustrative of one specific combination in accordance with this invention and that numerous other embodiments with different values for the various parameters may be utilized by those skilled in the art. It should be pointed out, however, that in circuits in accordance with this embodiment of the invention, the flip-flop transistor collector voltage swing is determined by the voltages necessary properly to bias the coupling diode 38 between the flip-flop and amplifier transistors to enable the amplifier transistor to clamp the flip-flop transistor out of saturation when the flip-flop transistor is conducting and to allow the connection to be broken, thereby enabling the base minority charge carriers to be swept out of the amplifier transistor, when the flip-flop transistor is not conducting. In the above-described specific embodiment, the minimum negative voltage excursion at the flip-flop transistor collector was slightly less than the −30 volts clamping potential applied to the collector of the amplifier transistor, and specifically was of the order of −32 volts, allowing for some drop across the collector-base of the amplifier transistor and across the diode 38. Since the most positive voltage applied to the D.-C. amplifier side of the diode 38, in this embodiment, is the −15 volts from source 42, the most positive swing of the flip-flop collector was approximately −12 volts in order to insure that the diode cut off when the flip-flop transistor was itself turned off. Further, as mentioned above, the D.-C. amplifier output, at point 52, is determined by the voltage swing and levels required by the logic of the output load circuit 15 and in this specific embodiment was from −15 to −30 volts; this also sets the values for the gate portion of the shift register stage.

Figure 3:
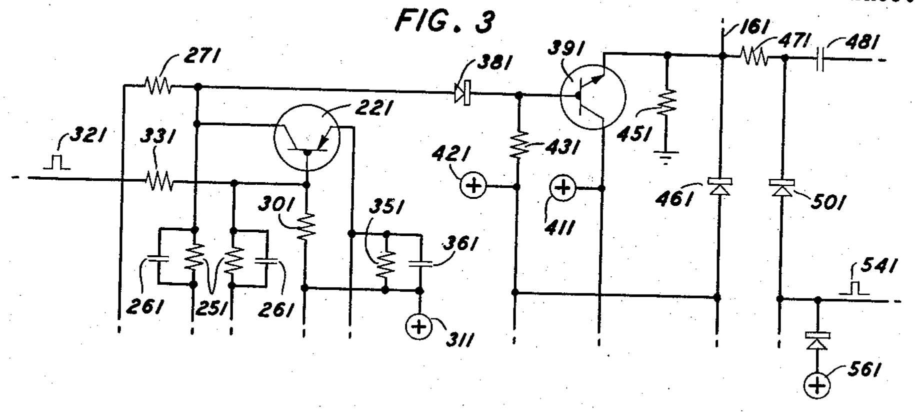
Figs. 3, 4, and 5 are schematic representations of a portion of a shift register stage in accordance with other embodiments of this invention.

In the embodiment of this invention described above with reference to Fig. 2, the flip-flop transistors were n-p-n junction transistors, the amplifier transistors p-n-p junction transistors, and the clamping voltage was applied to the collector of the amplifier transistor. It is apparent to those skilled in the art that numerous modifications may be made without departing from the spirit and scope of this invention. Thus, in the embodiment depicted in Fig. 3, which figure discloses only the upper portion of a shift register stage and in which similar or like elements are identified by the same reference numeral as in Fig. 1 but with the digit "1" added thereto, the flip-flop transistor 221 is a p-n-p junction transistor, the amplifier transistor 391 an n-p-n transistor, and the clamping voltage is applied from a positive source 411 to the collector of the amplifier transistor 391. As can be seen, the sources 311, 421, 411 and 561 are of the opposite potential to the source 31, 42, 41 and 56 in the embodiment of Fig. 1 and the decoupling diode 381 has been reversed. In this embodiment an electron storage problem arises in the amplifier transistor 391, the electrons, rather than holes, gathering in the base of the transistor and being swept out through resistor 431 to source 421.

Figure 4:
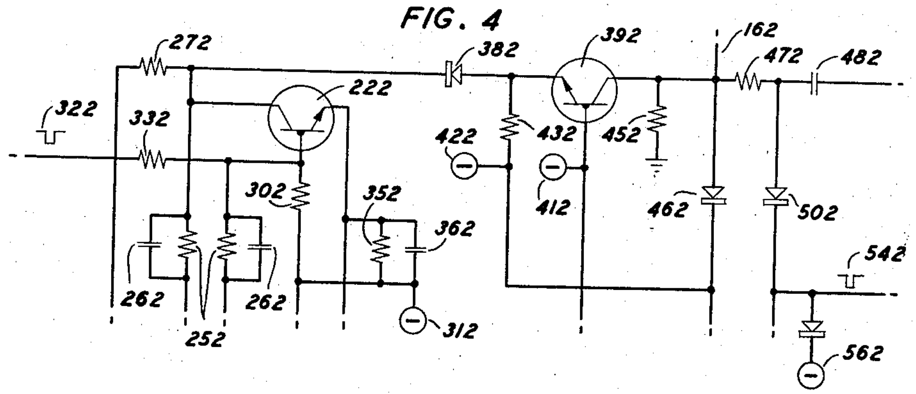

It is not essential in all embodiments of this invention that the direct current connection from the flip-flop transistor be made, through a decoupling diode, to the base of the amplifier transistor. In the embodiment of Fig. 4 wherein the flip-flop transistor 222 is again an n-p-n junction transistor, the collector of the flip-flop transistor is connected through the diode 382 to the emitter of the transistor 392, which may be an n-p-n junction transistor. In this embodiment, wherein similar or like elements are identified by the same reference numeral as in the embodiment of Fig. 2 but with the digit "2" added thereto, the clamping potential is applied to the base of the transistor 392 from a source 412. This embodiment may advantageously be employed where a voltage gain is desired from the amplifier transistor with a constant output current regardless of load, whereas the embodiments of Figs. 2 and 3 may advantageously be utilized for current gain and a varying current output to the load as well as voltage gain.

The diode 382 is less essential in the embodiment shown in Fig. 4 due to the faster diode action of the emitter to base junction of the amplifier transistor; however, it does provide optimum decoupling action between the flip-flop transistor and the amplifier and clamping transistor.

It is to be understood that both transistors 222 and 392 in the embodiment of Fig. 4 may be p-n-p junction transistors with appropriate reversal of the polarity of the various sources and bias voltages. Similarly, transistor 392 may be a point contact transistor.

Figure 5:
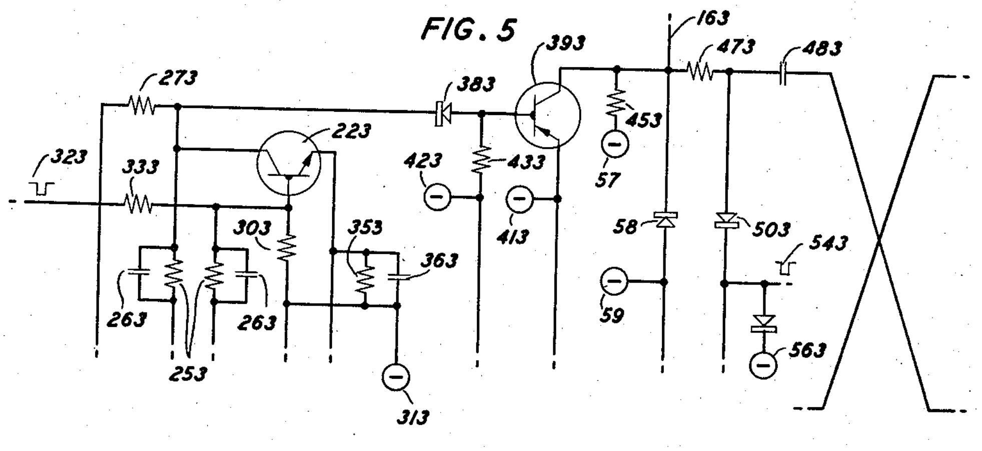

In the embodiment illustrated in Fig. 5, wherein again similar or like elements are identified by the same reference numeral as in the embodiment of Fig. 2 but with the digit "3" added thereto, the clamping potential is applied to the emitter of the amplifier transistor 393, the base of which is direct current coupled to the collector of the multivibrator transistor 223. In this embodiment, the multivibrator transistor 223 is an n-p-n junction transistor and the amplifier and clamping transistor 393 is a p-n-p junction transistor, though these may be reversed with a concomitant reversal of pulse and bias polarity. In this embodiment the decoupling diode 383 is again less essential in the direct current clamping connection between the base of the transistor 393 and the collector of the transistor 223 but it does provide optimum decoupling action between the two transistors. A suitable voltage bias, which in one illustrative embodiment was −45 volts when source 413 applying the clamping voltage to the emitter of transistor 383 was −30 volts, is applied through a diode 58 from a source 59 to the collector of the amplifier transistor. Source 57 was −60 volts and source 563 was −30 volts. It is to be noted that the output leads are now cross-coupled to opposite inputs to the next stage. The voltage at point 163 varies between −45 and −30 volts.

In each of these embodiments, as mentioned above, the n-p-n and p-n-p junction transistors can be transposed in both the amplifier and flip-flop sections by a reversal of the diodes and battery potentials. Further, in each of these embodiments pulses could be applied to the flip-flop transistors to turn them on rather than off, the pulses being applied to the bases or collectors as is known in the art.

Accordingly, it is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a first pair of transistors each having a base, emitter, and collector, means cross-connecting said bases and collectors to define a bistable circuit, a second pair of transistors each having a base, emitter, and collector electrode, means direct current coupling the collector of each of said first pair of transistors to one electrode of one of said second pair of transistors, a source of steady state potential connected to a second electrode of said second pair of transistors and through said direct current coupling means to said collectors, the potential at said source being sufficient to clamp the potential at said collectors above that requisite for said first pair of transistors to saturate, and output means connected to a third electrode of each of said second pair of transistors.

2. An electrical circuit in accordance with claim 1 further comprising means for effectively decoupling said first transistor from said second transistor when said first transistor is cut off.

3. An electrical circuit in accordance with claim 2 wherein said decoupling means comprises a diode connected in the direct current path between said first transistor and said second transistor and means biasing said diode to be back-biased when the potential at said collector starts to change from the conducting state.

4. An electrical circuit in accordance with claim 3 and further comprising means for sweeping out excess carriers from said second pair of transistors on turn-off of said second pair of transistors, said means comprising said biasing means and a resistor in series with said biasing means.

5. An electrical circuit in accordance with claim 1 wherein said collectors of said first pair of transistors are connected to the base electrodes of said second pair of transistors and said source of steady state potential is connected to the collector electrodes of said second pair of transistors.

6. An electrical circuit comprising a first transistor having a base, emitter, and collector, means applying voltages to said first transistor to establish conduction through said transistor, and means for clamping the potential at said collector at a value above that requisite for saturation of said first transistor when said first transistor is conducting, said clamping means comprising a second transistor having base, emitter, and collector electrodes, means direct current connecting said first transistor collector to one of said second transistor electrodes, and means applying a distinct clamping potential to another of said second transistor electrodes.

7. An electrical circuit in accordance with claim 6 further comprising means for effectively rupturing the connection between said first transistor collector and said second transistor on turn-off of said first transistor comprising a diode positioned in the connecting path between said first transistor collector and said second transistor.

8. An electrical circuit in accordance with claim 7 further comprising means for sweeping out excess carriers due to saturation of said second transistor, said last-mentioned means including said diode, a resistor connected to said one second transistor electrode, and a bias potential connected to said resistor.

9. An electrical circuit comprising a first transistor having a base, emitter, and collector, means applying voltages to said first transistor to establish conduction through said first transistor, and means for clamping the potential at said collector at a value above that requisite for saturation of said first transistor when said first transistor is conducting, said clamping means comprising a second transistor having a base, emitter, and collector, means direct current connecting said first transistor collector to said second transistor base, and means applying a distinct clamping potential to one of said second transistor emitter and collector sufficient to maintain said first transistor collector out of saturation.

10. An electrical circuit in accordance with claim 9 wherein said second transistor saturates on conduction of said first transistor comprising means for preventing excess charge carriers from said second transistor being swept back to said first transistor, said last-mentioned means comprising a diode positioned in the connecting path between said first transistor collector and said second transistor base and means applying a bias potential to said diode whereby said diode is back-biased effectively to interrupt said connecting path when said first transistor commences to turn off.

11. A shift register circuit comprising a plurality of stages, each of said stages comprising a first pair of transistors cross-connected to define a bistable circuit, each of said first transistors including a base, an emitter, and a collector, a second pair of transistors, each including an emitter, a base, and a collector electrode, means direct current coupling the collector of each of said first pair of transistors to an electrode of one of said second pair of transistors, a source of steady state potential connected to another electrode of each of said second pair of transistors and through said steady direct current coupling means to said collectors, the potential at said source being sufficient to clamp said first transistor collectors at a potential above that at which said first transistors saturate, and gate circuit means connected to a third electrode of each of said second transistors, and means applying a shift pulse to said gate circuit means to shift the information stored in each stage to the next stage of the shift register circuit.

12. A shift register circuit comprising a plurality of stages, each of said stages comprising a first pair of transistors cross-connected to define a bistable circuit, said transistors including a base, an emitter, and a collector, a second pair of transistors, each including a base, emitter and collector electrode, means for direct current coupling the collector of each of said first pair of transistors to the base electrode of one of said second transistors, means applying a potential to another electrode of each of said second transistors sufficient to clamp said first transistor collectors at a potential above that at which said first transistors saturate, a diode connected in said connecting paths between said first transistor collectors and said second transistor base electrodes, means biasing said diodes to back-bias said diodes when the first transistor connected thereto commences to turn off whereby excess charge carriers cannot be swept back from said second transistor base electrodes to said first transistors, and gate circuit means connected to a third electrode of said second transistors, and means applying a shift pulse to said gate circuit means to shift the information stored in each stage to the next stage of the shift register circuit.

13. A shift register circuit comprising a plurality of stages, each of said stages including a first pair of transistors each having a base, an emitter, and a collector, means cross-connecting the base of each transistor to the collector of the other transistor, a second pair of transistors each including a base, an emitter, and a collector, a pair of diodes, the base of each of said second transistors being direct current coupled through one of said diodes to the collector of one of said first transistors, a first source of potential connected to the collectors of said second transistors and of a value sufficient to clamp the collectors of said first transistors above the potential requisite for saturation of said first transistors, a second source of potential, and resistive means connecting said second potential source to said second transistor bases whereby charge carriers from said second transistors cannot be swept back into said first transistors, and means for shifting the information stored in one stage of the shift register circuit to the next stage of said shift register circuit.

References Cited in the file of this patent

UNITED STATES PATENTS

| | | |
|---|---|---|
| 2,534,233 | Cleeton | Dec. 19, 1950 |
| 2,622,213 | Harris | Dec. 16, 1952 |
| 2,655,609 | Shockley | Oct. 13, 1953 |
| 2,772,410 | Logue et al. | Nov. 27, 1956 |

OTHER REFERENCES

The Transistor, prepared by Bell Telephone Laboratories, Inc., Dec. 4, 1951 (Fig. 6, page 494 relied on).

Electronic Engineering, December 1950, "The Physical Realization of an Electronic Digital Computer," by A. D. Booth, pp. 492–8 (Fig. 96, p. 495 relied on).